March 24, 1964    F. P. MANETTI ETAL    3,126,243
SOCKET CUP AND CLOSURE THEREFOR
Original Filed May 8, 1959
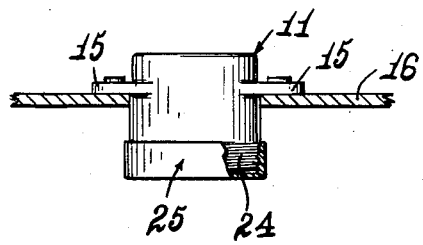
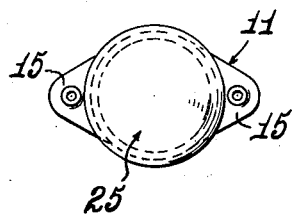
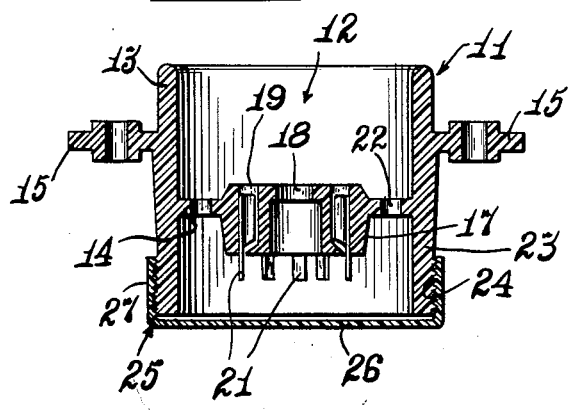
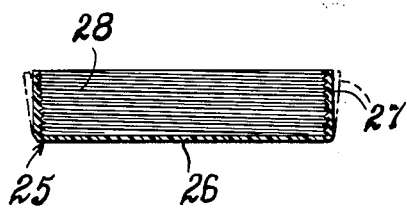
INVENTOR.
Fred P. Manetti
and Mario J. Manetti
By: Samuel W. Kipnis
Atty.

United States Patent Office 3,126,243
Patented Mar. 24, 1964

3,126,243
SOCKET CUP AND CLOSURE THEREFOR
Fred P. Manetti, 1442 William St., River Forest, Ill., and Mario J. Manetti, 1114 N. Kenilworth Ave., Oak Park, Ill.
Continuation of application Ser. No. 811,911, May 8, 1959. This application July 26, 1961, Ser. No. 131,045
5 Claims. (Cl. 339—111)

This application is a continuation of our application Serial No. 811,911, filed May 8, 1959, and now abandoned.

The invention relates to improvements in socket cups for electronic components and is particularly concerned with a novel socket cup for high voltage tubes, or the like, and a novel arc resisting closure cap for the bottom end thereof.

Socket cups used to mount high voltage electronic components, such as tubes, present a problem of proper covering and adequate insulation for the wire connecting contact elements disposed on the bottom side thereof so as to prevent arc discharge between said contact elements and electrical components mounted closely adjacent thereto. In the socket cup herein disclosed for purposes of illustration, the contact elements therein are surrounded by an annular skirt formed integral with the body of the cup but, owing to the difficulty of providing a good dielectric enclosure, such elements present a constant hazard. Various known devices to prevent arcing, such as the installation of a corona ring, have entailed structures that are costly to produce or which are not fully effective for the purpose intended.

The present invention is concerned with the construction and mounting of a novel closure cap that may be snap-fitted in place over the open end of the skirt and which, when in place, affords a moisture proof complete physical enclosure for the contact elements therein and a dielectric barrier between said elements and adjacent component electrical parts or wiring. The structure involves the formation of a thin wall cap having a peripheral flange or skirt integral with the end wall thereof and fabricated from suitable plastic material of a character having tough, heat and wear resisting qualities and wherein the flange is capable of circumferential expansion under applied force so as to be snap-fitted readily into place over the open end of the socket skirt. Both the socket skirt and the flange on the cap are provided with novel anti-friction means in the form of fine threads on complemental matching surfaces to resist displacement of the cap, moisture penetration and to retard leakage of current. Although the cap may be made of any suitable resiliently yieldable dielectric material it has been found that polyethylene compounds, such as for example, the kind commercially sold under the trade name "Grex," have the requisite characteristics of sufficient strength to resist stress-cracking, sufficient resiliently to permit the required yieldability for a tight snap-on fit; high heat resistance and flame retardant property, and excellent dielectric properties.

The structure by means of which the above noted and other advantages of the invention are attained will be described in the following specifications, taken in conjunction with the accompanying drawings, showing a preferred illustrative embodiment of the invention, in which:

FIG. 1 is an elevational view of a tube socket cup and cap embodying the invention, showing a portion of the cap broken away and a mounting panel in section.

FIG. 2 is a bottom plan view of the capped socket cup.

FIG. 3 is an enlarged vertical central sectional view of the socket cup and attached cap.

FIG. 4 is a sectional view of the cap, illustrating, in broken lines, the internally threaded peripheral flange or skirt thereof in expanded condition.

Referring to the exemplary disclosure in the accompanying drawings, the socket cup 11 comprises a molded one piece structure preferably fabricated from plastic or other material having requisite strength and high dielectric properties. It includes a cylindrical tube-receiving socket 12 formed by an annular wall 13 and a bottom wall 14. Preferably, a pair of diametrically opposed ears or lugs 15 are formed integral with annular wall 13 to facilitate mounting of the socket cup on a chassis or panel 16, with the lower extremity of the cup extending through an aperture therein.

The bottom wall 14 is formed with an axial boss 17 having an axial opening 18 to receive the usual axial stud on a tube (not shown) and a plurality of circumferentially spaced holes 19 each, or at least some, of which has mounted therein a contact terminal 21. The terminals 21 may be conventional and they are provided to make electrical contact with the usual prongs on the tube when said prongs are extended into holes 19 when the tube is in place. Each terminal 21 has a connector portion that projects beneath the bottom face of boss 17 to provide a terminal to which is connected a lead wire constituting a part of the circuitry in which the socket cup is mounted. These wires are extended upwardly through marginal openings 22 in bottom wall 14.

Depending below bottom wall 14 is an annular skirt 23 which constitutes an extension of the annular socket wall 13. As shown, this skirt is of sufficient length to locate its bottom edge below the lower ends of terminals 21 and the outside circumferential face of said skirt is formed with closely spaced fine screw threads 24 which extend a considerable distance upwardly from the bottom free edge of said skirt.

In order to provide a moisture proof closure and to conceal terminals 21 within the skirt and prevent arc discharge, the open bottom of the skirt is closed by a novel cap 25. This cap is comprised of an end wall 26 and a thin peripheral flange 27 of considerable depth which is internally threaded throughout its depth, as at 28. The cap is fabricated of plastic material of the character mentioned hereinabove and, because of the inherent resiliency of such material, and the fineness of the threads in the flange, the cap may be press-fitted easily and quickly over the skirt and, when in place, is held firmly by interengagement of the matching threads 24 and 28, and it may be removed most easily by rotating the cap relative to the skirt in a direction to unscrew same therefrom, although it may be removed by physical engagement of its peripheral top edge at various points to gradually pry or work the cap off of the skirt. Irrespective of the manner by which removal may be accomplished, the cap is held firmly in place until removal is positively effected; consequently there is never the possibility of the cap becoming displaced unintentionally or accidentally. As a result, terminals 21 and the lead wires thereto are adequately enclosed in a dielectric enclosure that is highly resistant to stress-cracking, heat and fire and more important because of the fineness of the matching threads (approximately 22 per inch) and the area occupied by same, an elongated tortuous path is provided along the matching faces to resist current leakage at the joint and resultant arc discharge.

Although we have described a preferred embodiment of our invention in considerable detail, it will be understood that the description thereof is intended to be illustrative, rather than restrictive, as many details of the structure shown may be modified or changed without departing from the spirit or scope of the invention. Accordingly we do not desire to be restricted to the exact construction described.

We claim:

1. A dielectric socket cup for high voltage tubes comprising a bottom wall carrying prong receiving terminals, said terminals extending through said bottom wall, an annular skirt on said cup depending from said bottom wall and surrounding the terminals, said skirt being of a length to locate its free peripheral edge below the plane of the terminals surrounded thereby, fine external threads on the lower margin of said skirt and extending over a substantial portion thereof, a cap on the bottom of said skirt including a wide circumferential flange, fine internal threads on said flange engageable with the threads on the skirt to retain the cap in place thereon, said cap having thin-wall construction and being fabricated from heat resistant polyethylene plastic material whereby at least the cap flange is resiliently yieldable to permit the cap to be snap-fitted in place on the skirt by hand, said threads thereof securing the cap to the skirt against unintentional and/or accidental removal, affording a long path of resistance to leakage of electric current from the interior of said socket cup.

2. A dielectric socket cup for high voltage tubes comprising a tube receiving cup including a bottom wall carrying prong receiving terminals, said terminals extending through said wall, an annular skirt on said cup depending from the bottom wall and surrounding the terminals, said skirt being of a length to locate its free peripheral edge below the plane of the terminals surrounded thereby, external threads in the order of about 22 threads per inch on the lower margin of said skirt and extending over a substantial area thereof, a flanged cap on the bottom of said skirt, the flange thereof having a depth responding substantially to the area of the skirt bearing the threads, internal threads of a like order in said flanged cap engageable with the threads on the skirt to retain the cap in place thereon, said cap having thin-wall construction throughout and being fabricated from heat resistant polyethylene plastic material whereby at least the cap flange is resiliently yieldable to permit the cap to be snap-fitted in place on the skirt by hand, said threads thereafter securing the cap to the skirt against unintended and/or accidental removal.

3. A dielectric socket cup for high voltage tubes comprising a tube receiving cup including a bottom wall carrying prong receiving terminals, said terminals extending through said wall, an annular skirt on said cup depending from the bottom wall and surrounding the terminals, said skirt being of a length to locate its free peripheral edge below the plane of the terminals surrounded thereby, external threads on the lower margin of said skirt and extending over a substantial area thereof, a flanged cap on the bottom of said skirt, the flange thereof having a depth responding substantially to the area of the skirt and bearing the threads, internal threads in said flanged cap engageable with the threads on the skirt to retain the cap in place thereon, said cap having thin-wall construction throughout and being fabricated from heat resistant plastic material whereby at least the cap flange is resiliently yieldable to permit the cap to be snap-fitted in place on the skirt by hand, said threads thereafter securing the cap to the skirt against unintended and/or accidental removal, affording a long path of resistance to leakage of electric current from the interior of said socket cup.

4. A dielectric socket cup for high voltage tubes comprising a bottom wall carrying prong receiving terminals, said terminals extending through said wall, an annular skirt on said wall depending from the bottom wall and surrounding the termials, said skirt being of a length to locate its free peripheral edge below the plane of the terminals surrounded thereby, external threads in the order of about 22 threads per inch on the lower margin of said skirt and extending over a substantial area thereof, a flanged cap on the bottom of said skirt, the flange thereof having a depth responding substantially to the threaded area of the skirt, internal threads of a like order in said flanged cap engageable with the threads on the skirt to retain the cap in place thereon, said cap having thin-wall construction throughout and being fabricated from heat resistant plastic material whereby at least the cap flange is resiliently yieldable to permit the cap to be snap-fitted in place on the skirt by hand, said threaded connection affording a long path of resistance to leakage of electric current from the interior of said socket cup.

5. A dielectric socket cup for high voltage tubes comprising a tube receiving cup including a bottom wall carrying prong receiving terminals, said terminals extending through said wall, an annular skirt on said cup depending from the bottom wall and surrounding the terminals, said skirt being of thick wall construction throughout and being of a length to locate its free peripheral edge below the plane of the terminals surrounded thereby, external threads on the lower margin of said skirt and extending over a substantial area thereof, a flanged cap on the bottom of said skirt, the flange thereof having a depth responding substantially to the area of the skirt bearing the threads, internal threads in said flanged cap engageable with the threads on the skirt to retain the cap in place thereon, said cap being fabricated from heat resistant plastic material and at least the wall of the cap flange being thinner than the wall of the skirt so as to be resiliently yieldable to permit the cap to be snap-fitted in place on the skirt by hand, said threads thereafter securing the cap to the skirt against unintended removal and affording a long path of resistance to leakage of electric current from the interior of said socket cup.

References Cited in the file of this patent

UNITED STATES PATENTS

| | | |
|---|---|---|
| 1,564,321 | Cameron | Dec. 8, 1925 |
| 1,970,968 | McCloy et al. | Aug. 21, 1934 |
| 1,993,881 | Grigg | Mar. 12, 1935 |
| 2,670,870 | Fleischer | Mar. 2, 1954 |
| 2,850,714 | Pace | Sept. 2, 1958 |
| 2,861,252 | Fremont | Nov. 18, 1958 |
| 2,878,905 | Langermeier | Mar. 24, 1959 |
| 2,900,435 | Curtiss | Aug. 18, 1959 |
| 2,991,902 | Lind | July 11, 1961 |